(12) United States Patent
Xing et al.

(10) Patent No.: US 12,271,591 B2
(45) Date of Patent: Apr. 8, 2025

(54) DATA REDUCTION METHOD AND APPARATUS

(71) Applicant: HUAWEI TECHNOLOGIES CO., LTD., GuangDong (CN)

(72) Inventors: Hui Xing, Shanghai (CN); Zengshi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 18/150,420

(22) Filed: Jan. 5, 2023

(65) Prior Publication Data

US 2023/0152974 A1 May 18, 2023

Related U.S. Application Data

(63) Continuation of application No. PCT/CN2021/097715, filed on Jun. 1, 2021.

(30) Foreign Application Priority Data

Jul. 9, 2020 (CN) .......................... 202010671816.2

(51) Int. Cl.
G06F 3/06 (2006.01)
G06F 16/174 (2019.01)

(52) U.S. Cl.
CPC .......... *G06F 3/0608* (2013.01); *G06F 3/0641* (2013.01); *G06F 3/0671* (2013.01); *G06F 16/1744* (2019.01)

(58) Field of Classification Search
None
See application file for complete search history.

(56) References Cited

U.S. PATENT DOCUMENTS

| 6,348,881 B1 * | 2/2002 | Buer | H03M 7/3084 |
| | | | 375/240 |
| 7,079,051 B2 * | 7/2006 | Storer | H03M 7/30 |
| | | | 341/51 |

(Continued)

FOREIGN PATENT DOCUMENTS

| CN | 110175169 A | 8/2019 |
| CN | 110196848 A | 9/2019 |

(Continued)

OTHER PUBLICATIONS

Julie Watson, "What is VDI? How Does Virtual Desktop Infrastructure Work?", Aug. 17, 2018, pp. 1-17, https://www.acecloudhosting.com/blog/what-is-vdi-how-it-work/ (Year: 2018).*

*Primary Examiner* — Christopher D Birkhimer
(74) *Attorney, Agent, or Firm* — Rimon PC (57) ABSTRACT

A data reduction method and apparatus are provided to improve data reduction performance. In the method a storage device obtains a first service type of first data stored in a first logical unit. The storage device processes the first data based on a first data reduction manner that matches the first service type. The storage device obtains a second service type of second data stored in a second logical unit. The second service type is different from the first service type. The storage device processes the second data based on a second data reduction manner that matches the second service type. The first data reduction manner includes data compression and/or data deduplication. The second data reduction manner includes data compression and/or data deduplication. The first data reduction manner is different from the second data reduction manner.

18 Claims, 5 Drawing Sheets

(56) References Cited

U.S. PATENT DOCUMENTS

| | | | |
|---|---|---|---|
| 7,236,528 B1* | 6/2007 | Nie | H04N 19/587 375/E7.145 |
| 8,396,841 B1* | 3/2013 | Janakiraman | G06F 3/0608 707/802 |
| 8,732,403 B1* | 5/2014 | Nayak | G06F 3/0619 711/170 |
| 9,584,620 B1 | 2/2017 | Iyengar | |
| 9,715,434 B1* | 7/2017 | Xu | G06F 3/067 |
| 9,733,836 B1* | 8/2017 | Garg | G06F 3/0641 |
| 10,108,543 B1* | 10/2018 | Duggal | G06F 11/14 |
| 10,108,544 B1* | 10/2018 | Duggal | G06F 11/14 |
| 10,228,858 B1* | 3/2019 | Stoakes | G06F 3/0641 |
| 10,303,655 B1* | 5/2019 | Bigman | G06F 3/0604 |
| 10,346,076 B1* | 7/2019 | Jonnala | G06F 3/067 |
| 10,664,165 B1* | 5/2020 | Faibish | G06F 3/0638 |
| 10,719,301 B1* | 7/2020 | Dasgupta | G06F 8/34 |
| 10,795,812 B1* | 10/2020 | Duggal | G06F 3/067 |
| 2008/0144079 A1* | 6/2008 | Pandey | H03M 7/30 358/1.15 |
| 2009/0089483 A1* | 4/2009 | Tanaka | G06F 3/0608 711/E12.008 |
| 2009/0204650 A1* | 8/2009 | Wong | G06F 16/1744 |
| 2010/0077013 A1* | 3/2010 | Clements | G06F 16/1748 707/822 |
| 2010/0082672 A1* | 4/2010 | Kottomtharayil | G06F 11/1451 711/E12.001 |
| 2010/0088296 A1* | 4/2010 | Periyagaram | G06F 16/183 707/E17.014 |
| 2010/0125553 A1* | 5/2010 | Huang | G06F 11/1453 707/661 |
| 2010/0174881 A1* | 7/2010 | Anglin | G06F 11/1453 711/E12.103 |
| 2010/0281081 A1* | 11/2010 | Stager | G06F 9/5022 707/814 |
| 2010/0333116 A1* | 12/2010 | Prahlad | G06F 3/067 713/153 |
| 2013/0114701 A1* | 5/2013 | Lim | H04N 19/61 375/240.03 |
| 2013/0166861 A1* | 6/2013 | Takano | G06F 3/064 711/161 |
| 2014/0049413 A1* | 2/2014 | Agarwal | H03M 7/30 341/87 |
| 2014/0114932 A1* | 4/2014 | Mallaiah | G06F 3/0641 707/E17.032 |
| 2014/0143517 A1* | 5/2014 | Jin | G06F 12/023 711/171 |
| 2015/0095553 A1* | 4/2015 | Walls | G06F 3/0638 711/103 |
| 2015/0205816 A1* | 7/2015 | Periyagaram | G06F 11/1453 707/827 |
| 2015/0261776 A1* | 9/2015 | Attarde | G06F 16/1748 707/664 |
| 2016/0350324 A1* | 12/2016 | Wang | G06F 16/137 |
| 2017/0038978 A1* | 2/2017 | Li | G06F 3/0611 |
| 2017/0308557 A1 | 10/2017 | Cassidy et al. | |
| 2018/0095674 A1* | 4/2018 | Alameldeen | G06F 3/064 |
| 2018/0138921 A1* | 5/2018 | Arelakis | H03M 7/3071 |
| 2018/0314727 A1* | 11/2018 | Epstein | G06N 5/01 |
| 2019/0205704 A1* | 7/2019 | Zhu | G06F 18/24 |
| 2019/0235778 A1* | 8/2019 | Jin | H04L 67/1097 |
| 2020/0034040 A1* | 1/2020 | Garman | G06F 3/064 |
| 2020/0097571 A1* | 3/2020 | Mathur | G06F 16/2282 |
| 2020/0133783 A1* | 4/2020 | Kumar | G06F 11/349 |
| 2020/0310686 A1* | 10/2020 | Truong | G06F 3/061 |
| 2021/0036714 A1* | 2/2021 | Martin | G06F 13/1668 |
| 2021/0374021 A1* | 12/2021 | Santhakumar | G06F 3/0659 |

FOREIGN PATENT DOCUMENTS

| | | | | |
|---|---|---|---|---|
| CN | 110941598 A | | 3/2020 | |
| WO | WO-2013157103 A1 | * | 10/2013 | G06F 3/0608 |

* cited by examiner

FIG. 8

DATA REDUCTION METHOD AND APPARATUS

CROSS-REFERENCE TO RELATED APPLICATIONS

This application is a continuation of International Application No. PCT/CN2021/097715, filed on Jun. 1, 2021, which claims priority to Chinese Patent Application No. 202010671816.2 filed on Jul. 9, 2020. The disclosures of the aforementioned applications are hereby incorporated by reference in their entireties.

TECHNICAL FIELD

Embodiments of this application relate to the computer field, and in particular, to a data reduction method and apparatus.

BACKGROUND

With the development of storage technologies, a large amount of data information needs to be stored. To improve storage efficiency, stored data may be reduced. For example, stored duplicate data is deleted, or the stored data is compressed. Therefore, effective data reduction is of great significance.

There are many general data reduction methods, such as in-line deduplication, post-process deduplication, Lempel-Ziv77 (Lempel-Ziv77, lz77), Lempel-Ziv4 (Lempel-Ziv4, lz4), and zstandard (zstandard, ZSTD). However, if data in different storage methods is reduced in the general data reduction method, data reduction performance is relatively low.

SUMMARY

This application provides a data reduction method and apparatus, to improve data reduction performance.

To achieve the foregoing objective, the following technical solutions are used in this application.

According to a first aspect, this application provides a data reduction method. The method may include: obtaining a first service type of first data stored in a first logical unit; processing the first data in a first data reduction manner that matches the first service type, where the first data reduction manner includes data compression and/or data deduplication; obtaining a second service type of second data stored in a second logical unit, where the second service type is different from the first service type; and processing the second data based on a second data reduction manner that matches the second service type, where the second data reduction manner includes data compression and/or data deduplication, and the first data reduction manner is different from the second data reduction manner.

According to the data reduction method provided in this application, based on a service type of data stored in a logical unit, a reduction manner matching the service type is selected to reduce the data in the logical unit, thereby improving data reduction performance.

With reference to the first aspect, in a possible implementation, the first data may include a plurality of first data blocks, and the obtaining a first service type of first data stored in a first logical unit may include: obtaining one or more sample data blocks in the plurality of first data blocks; and determining the first service type of the first data based on a service type of the one or more sample data blocks. In this possible implementation, the first service type of the first data is determined by using the service types of the plurality of sample data blocks, so that efficiency of determining the service type of the first data is improved, and data reduction performance is further improved.

With reference to the first aspect or the foregoing possible implementation, in another possible implementation, the determining the first service type of the first data based on a service type of the one or more sample data blocks may include: if the service type of the one or more sample data blocks is a same service type, determining that the first service type of the first data is consistent with the service type of the one or more sample data blocks. In this possible implementation, sample data belongs to the same service type, and it is determined that the first service type is the same service type. This improves accuracy of identifying the service type of the data, and further improves data reduction performance.

With reference to the first aspect or the foregoing possible implementation, in another possible implementation, the determining the first service type of the first data based on a service type of the one or more sample data blocks may include: if the service type of the one or more sample data blocks includes a plurality of service types, determining the first service type of the first data based on proportions of the plurality of service types and a preset rule. In this possible implementation, the preset rule may be flexibly configured, thereby improving accuracy of identifying the service type of the data, and further improving data reduction performance.

The preset rule may be configured based on an actual requirement. The preset rule may be statically configured in a design phase of a storage device, or the preset rule may be set to configurable content, and a user, an administrator, or another person of the storage device modifies a configuration in a use phase of the storage device. This is not limited in this application.

With reference to the first aspect or the foregoing possible implementation, in another possible implementation, if the first logical unit provides storage space for a database, the preset rule may include: determining a service type with a highest proportion as the first service type of the first data; or determining a service type whose proportion is greater than a first threshold as the first service type of the first data; or if there is no service type whose proportion is greater than the first threshold in the plurality of service types, and a proportion of each of the plurality of service types is in a first range, determining the plurality of service types as the first service types of the first data, where the first range includes an average value of the proportions of the plurality of service types; or if there is no service type whose proportion is greater than the first threshold in the plurality of service types, and a proportion of a service type in the plurality of service types is not in a first range, determining a service type whose proportion is greater than or equal to a second threshold in the plurality of service types as the first service type of the first data. In this possible implementation, the service type of the data may be determined based on that the first logical unit provides storage space for the database and based on the preset rule suitable for this case. This improves accuracy of identifying the service type of the data, and further improves data reduction performance.

With reference to the first aspect or the foregoing possible implementation, in another possible implementation, if the first logical unit provides storage space for a virtual machine, the preset rule may include: determining a service type whose proportion is greater than a third threshold as the first service type of the first data. In this possible implementation, the service type of the data may be determined based on that the first logical unit provides storage space for the virtual machine and based on the preset rule suitable for this case. This improves accuracy of identifying the service type of the data, and further improves data reduction performance.

With reference to the first aspect or the foregoing possible implementation, in another possible implementation, the method may further include: extracting a feature value of a first feature of a first sample data block, where the first feature is a feature of a third service type, and the first sample data block is any sample data block in the one or more sample data blocks; and if the feature value of the first feature meets a constraint of the third service type, determining that a service type of the first sample data block is the third service type. In this possible implementation, the service type of the data block is determined when the feature of the service type of the data block meets the constraint of the service type, so that accuracy of identifying the service type of the data block is relatively high. This improves accuracy of identifying the service type of the data, and further improves data reduction performance.

With reference to the first aspect or the foregoing possible implementation, in another possible implementation, the method may further include: obtaining a front part of data of the first logical unit; extracting a feature value of a second feature of the front part of data, where the second feature is a feature of a fourth service type; and if the feature value of the second feature meets a constraint of the fourth service type, determining that the first service type is any service type included in a virtual application type, where the service type that may be included in the virtual application type is one or more of the following: a virtual desktop infrastructure (VDI) type and a virtual server infrastructure (VSI) type; or if the feature value of the second feature does not meet a constraint of the fourth service type, determining that the first service type is any service type included in a database application type, where the service type that may be included in the database application type is one or more of the following: a structured query language (Sqlserver) database type, an Oracle database type, a Mongodb database type, and a My-innodb database type. In this possible implementation, when the first service type is determined, the application type is first determined. This can improve efficiency of identifying the service type, and further improve data reduction performance.

With reference to the first aspect or the foregoing possible implementation, in another possible implementation, the first service type may include one or more of the following: a Sqlserver database type, an Oracle database type, a Mongodb database type, a My-innodb database type, a VDI type, and a VSI type. The second service type may include one or more of the following: the Sqlserver database type, the Oracle database type, the Mongodb database type, the My-innodb database type, the VDI type, and the VSI type. In this possible implementation, the service type of the data has a detailed classification, and different data reduction algorithms may be matched based on the detailed classification of the service type, thereby improving data reduction performance.

According to a second aspect, this application provides a data reduction apparatus, configured to implement the method described in the first aspect. The data reduction apparatus may be deployed in a storage device, or the data reduction apparatus may be an apparatus that supports the storage device in implementing the method described in the first aspect. For example, the apparatus includes a chip system. The storage device includes at least a first logical unit and a second logical unit. The first logical unit and the second logical unit are configured to provide storage space for an application. For example, the data reduction apparatus may include a first obtaining unit, a first processing unit, a second obtaining unit, and a second processing unit.

The first obtaining unit is configured to obtain a first service type of first data stored in the first logical unit.

The first processing unit is configured to process the first data based on a first data reduction manner that matches the first service type, where the first data reduction manner includes data compression and/or data deduplication.

The second obtaining unit is configured to obtain a second service type of second data stored in the second logical unit, where the second service type is different from the first service type.

The second processing unit is configured to process the second data based on a second data reduction manner that matches the second service type, where the second data reduction manner includes data compression and/or data deduplication.

The first data reduction manner is different from the second data reduction manner.

According to the data reduction apparatus provided in this application, based on a service type of data stored in a logical unit, a reduction manner matching the service type is selected to reduce the data in the logical unit, thereby improving data reduction performance.

It should be noted that specific implementations of the units in the second aspect are the same as those in corresponding method descriptions in the first aspect. Details are not described herein again. The function modules in the second aspect may be implemented by hardware, or may be implemented by hardware by executing corresponding software. The hardware or the software includes one or more modules corresponding to the functions. For example, a transceiver is configured to implement functions of a receiving unit and a sending unit, a processor is configured to implement a function of the processing unit, and a memory is configured to store program instructions used by the processor to process the method in embodiments of this application. The processor, the transceiver, and the memory are connected and communicate with each other through a bus.

According to a third aspect, this application provides a data reduction apparatus. The data reduction apparatus may implement functions in the foregoing method examples. The functions may be implemented by hardware, or may be implemented by hardware executing corresponding software. The hardware or the software includes one or more modules corresponding to the functions. The data reduction apparatus may exist in a product form of a chip.

With reference to the third aspect, in a possible implementation, the data reduction apparatus may be a storage device. A structure of the storage device includes a processor and a transceiver. The processor is configured to support the data reduction apparatus in performing a corresponding function in the foregoing method. The transceiver is configured to support communication between the storage device and another device. The storage device may further include a memory. The memory is configured to be coupled to the processor, and the memory stores program instructions and data that are necessary for the server.

According to a fourth aspect, a computer-readable storage medium including instructions is provided. When the instructions are run on a computer, the computer is enabled to perform the data reduction method provided in any one of the foregoing aspects or the possible implementations.

According to a fifth aspect, a computer program product including instructions is provided. When the computer program product runs on a computer, the computer is enabled to perform the data reduction method in any one of the foregoing aspects or the possible implementations.

According to a sixth aspect, an embodiment of this application provides a chip system. The chip system includes a processor, and may further include a memory, configured to implement a function in the foregoing method. The chip system may include a chip, or may include a chip and another discrete device.

It should be noted that various possible implementations in any one of the foregoing aspects may be combined on a premise that the solutions are not contradictory.

DESCRIPTION OF EMBODIMENTS

In this specification, the claims, and the accompanying drawings of this application, the terms "first", "second", "third", and the like are intended to distinguish between different objects but do not limit a particular order.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

In the descriptions of this application, "I" represents an "or" relationship between associated objects unless otherwise specified. For example, AB may represent A or B. "And/or" in this application represents only an association relationship between associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In embodiments of this application, "at least one" may also be described as "one or more", and "a plurality of" may be "two, three, four, or more". This is not limited in this application.

For ease of understanding, technical terms in this application are explained first.

A logical unit may be a storage resource including one or more physical disks in a storage device, and the logical unit may be configured to provide storage space for an application. For example, one logical unit may be storage space including one or more disks.

A service type may be a type of an application to which data stored in a storage device belongs. For example, when data of an application of a database type is stored in the storage device, a service type of the data may be the database type; or when data of a virtual machine type is stored in the storage device, a service type of the data may be the virtual machine type.

A data block may refer to a minimum storage unit of data in a storage device. For different service types, data blocks in the storage device have different storage formats.

A constraint may refer to a feature of a service type when data is stored. One service type may have one constraint, and different service types may have different constraints. The constraint includes a feature and a condition that the feature needs to meet. The feature is used to indicate a data storage feature, and a feature value is used to indicate a specific value of the feature.

In the conventional technology, when data in a storage device is reduced, there are many general data reduction methods, such as in-line deduplication, post-process deduplication, lz77, lz4, and ZSTD. However, for data in different storage manners (namely, different service types), a general data reduction method is used for reduction.

During actual data storage, different storage methods (service types) may be used. If the general reduction method is used for data of all service types, data reduction performance is relatively low.

Based on this, this application provides a data reduction method. Based on a service type of data stored in a logical unit, a reduction manner matching the service type is selected to reduce the data in the logical unit, thereby improving data reduction performance.

The following describes implementations of embodiments of this application in detail with reference to accompanying drawings.

Figure 1:
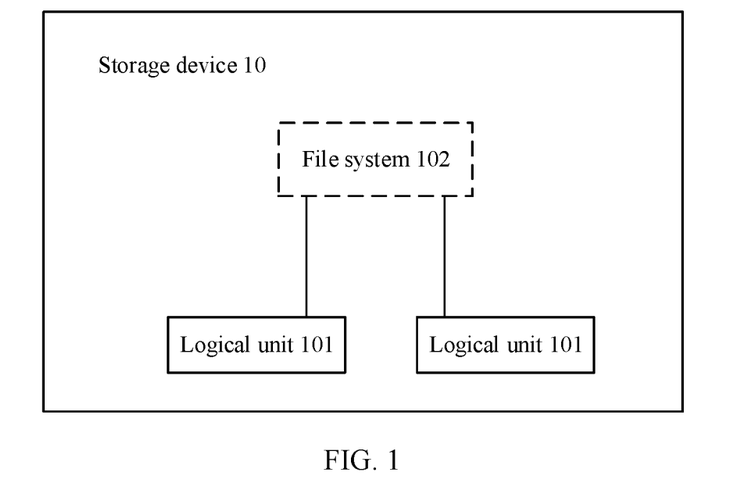
FIG. 1 is a schematic diagram of a structure of a storage device according to this application.

The data reduction method provided in embodiments of this application may be applied to a storage device 10 shown in FIG. 1. As shown in FIG. 1, the storage device 10 may include a plurality of logical units 101.

The logical unit 101 may be configured to provide storage space for different applications, and the logical unit 101 stores data of one or more applications.

The storage device 10 may be a device having a related processing capability, for example, a hard disk, a server, or a cloud storage device. A specific form of the storage device is not limited in this application.

For example, the logical unit 101 in the storage device 10 may be configured to provide storage space for a database application, and the logical unit 101 stores data of one or more database applications.

For example, the logical unit 101 in the storage device 10 may be configured to provide storage space for a virtual machine application, and the logical unit 101 stores data of one or more virtual machine applications.

For example, the logical unit 101 in the storage device 10 may be configured to provide storage space for a virtual machine application, and the logical unit 101 stores data of different database applications of one or more virtual machines.

Optionally, as shown in FIG. 1, the storage device 10 may further include a file system 102. The file system 102 is configured to output, in different file types, the data stored in the logical unit 101.

The following describes in detail a data reduction method and apparatus provided in embodiments of this application with reference to the accompanying drawings.

According to an aspect, an embodiment of this application provides a storage device 20, configured to perform the data reduction method provided in this application. The storage device 20 may be the storage device 10 shown in FIG. 1.

Figure 2:
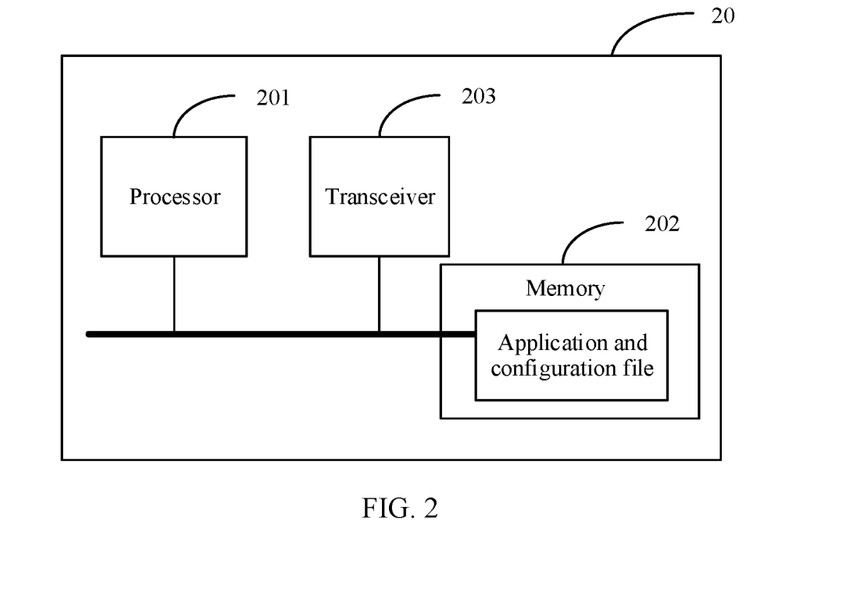
FIG. 2 is a schematic diagram of a structure of another storage device according to this application.

As shown in FIG. 2, the storage device 20 may include a processor 201, a memory 202, and a transceiver 203.

The following describes each component of the storage device 20 in detail with reference to FIG. 2.

The memory 202 may be a volatile memory, for example, a random access memory (RAM); or a non-volatile memory, for example, a read-only memory (ROM), a flash memory, a hard disk drive (HDD), or a solid-state drive (SSD); or a combination of the foregoing types of memories, configured to store program code, a configuration file, or other content that can implement the method in this application.

The processor 201 is a control center of the storage device 20. For example, the processor 201 may be a central processing unit (CPU), or an application-specific integrated circuit (ASIC), or may be configured as one or more integrated circuits implementing embodiments of this application, for example, one or more microprocessors (digital signal processor, DSP), or one or more field programmable gate arrays (FPGA).

The transceiver 203 is configured to communicate with another device. The transceiver 203 may be a communication port or the like.

The processor 201 performs the following functions by running or executing an application and a configuration file and/or a module that are stored in the memory 202 and by invoking data stored in the memory 202:

obtaining a first service type of first data stored in a first logical unit; processing the first data in a first data reduction manner that matches the first service type, where the first data reduction manner includes data compression and/or data deduplication; obtaining a second service type of second data stored in a second logical unit, where the second service type is different from the first service type; and processing the second data based on a second data reduction manner that matches the second service type, where the second data reduction manner includes data compression and/or data deduplication, and the first data reduction manner is different from the second data reduction manner.

Figure 3:
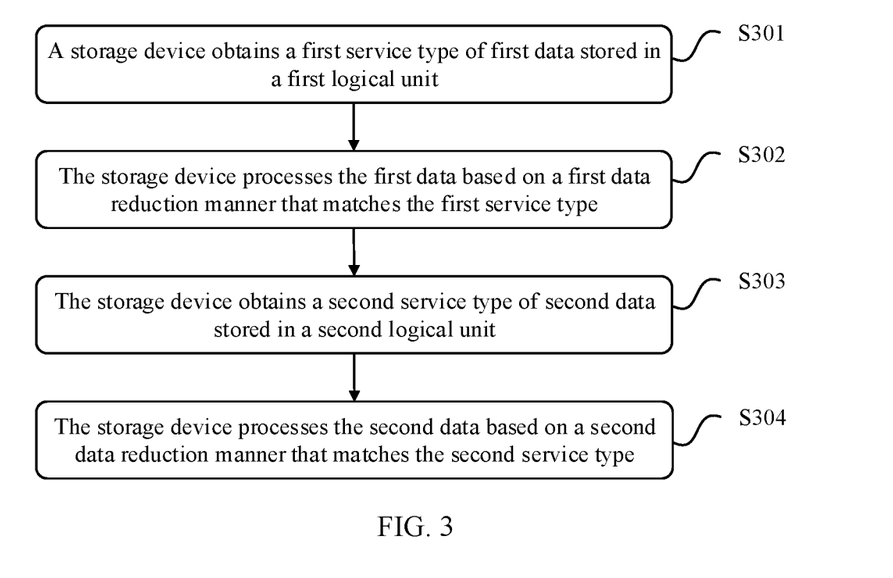
FIG. 3 is a schematic flowchart of a data reduction method according to this application.

According to another aspect, an embodiment of this application provides a data reduction method, applied to a storage device. The storage device may be the storage device 10 shown in FIG. 1 or the storage device 20 shown in FIG. 2. The storage device includes at least a first logical unit and a second logical unit. The first logical unit and the second logical unit are configured to provide storage space for an application. As shown in FIG. 3, the data reduction method provided in this application may include the following steps.

S301: The storage device obtains a first service type of first data stored in the first logical unit.

The first logical unit may be any logical unit in the storage device.

The first service type is used to indicate a type of an application to which the first data stored in the storage unit belongs.

Specifically, an implementation of S301 may include but is not limited to the following solution 1 or solution 2.

Solution 1: The storage device determines the first service type of the first data based on a service type of one or more sample data blocks in a plurality of first data blocks included in the first data.

In a possible implementation, all the plurality of first data blocks included in the first data may be used as sample data blocks.

In another possible implementation, some of the plurality of first data blocks included in the first data may be used as sample data blocks.

Specifically, an implementation of the solution 1 in S301 may include but is not limited to the following step 1 and step 2.

Step 1: The storage device obtains the first data stored in the first logical unit.

In a possible implementation, the storage device obtains all data in the first logical unit as the first data stored in the first logical unit.

For example, the storage device obtains, in a full automatic scan manner, all the data in the first logical unit as the first data stored in the first logical unit.

In another possible implementation, the storage device obtains sampled data in the first logical unit as the first data stored in the first logical unit.

For example, the storage device scans data in the first logical unit at a fixed data sampling frequency and a fixed size of sampled data, to obtain the sampled data in the first logical unit, and uses the sampled data as the first data stored in the first logical unit.

The data sampling frequency and the size of the sampled data may be configured based on an actual requirement. This is not specifically limited in this application. For example, the size of the sampled data is greater than a size of one data block.

Step 2: The storage device determines the first service type of the first data based on the service type of the one or more sample data blocks in the plurality of first data blocks included in the first data.

Step 2 may be implemented as follows: The storage device separately obtains the service type of the one or more sample data blocks in the plurality of first data blocks included in the first data, and then determines the first service type of the first data based on the service type of each sample data block included in the first data. Details are described below.

First, the storage device obtains the service type of each sample data block. Specifically, for a process in which the storage device obtains a service type of first sample data (where the first sample data is any sample data of the one or more sample data blocks in the plurality of first data blocks included in the first data), refer to the following S3011 and S3012. Details are not described herein. The storage device performs the following S3011 and S3012 on each sample data block, to obtain the service type of each sample data block included in the first data.

Second, that the storage device determines the first service type of the first data based on the service type of each sample data block included in the first data may specifically include the following steps.

If the service type of the one or more sample data blocks is a same service type, the storage device determines that the first service type of the first data is consistent with the service type of the one or more sample data blocks. Alternatively, if the service type of the one or more sample data blocks includes a plurality of service types, the storage device determines the first service type of the first data based on proportions of the plurality of service types and a preset rule.

The preset rule may be configured based on an actual requirement. This is not limited in this application. The preset rule may be statically configured in a design phase of the storage device, or the preset rule may be set to configurable content, and a user, an administrator, or another person of the storage device modifies a configuration in a use phase of the storage device.

In a possible implementation, the first logical unit provides storage space for a database, and the preset rule may include: determining a service type with a highest proportion as the first service type of the first data; or determining a service type whose proportion is greater than a first threshold as the first service type of the first data; or if there is no service type whose proportion is greater than the first threshold in the plurality of service types, and a proportion of each of the plurality of service types is in a first range, determining the plurality of service types as the first service types of the first data, where the first range includes an average value of the proportions of the plurality of service types; or if there is no service type whose proportion is greater than the first threshold in the plurality of service types, and a proportion of a service type in the plurality of service types is not in a first range, determining a service type whose proportion is greater than or equal to a second threshold in the plurality of service types as the first service type of the first data.

The first threshold, the second threshold, and the first range may be configured based on an actual requirement. This is not specifically limited in this application.

A proportion of a service type is a ratio of a quantity of the service type to a quantity of service types of all sample data blocks.

Alternatively, a proportion of a service type is a ratio of a quantity of the service type to a quantity of service types of sample data blocks obtained by subtracting invalid data blocks (for example, zero-data blocks) from all sample data blocks.

A zero-data block is an all-zero data block. In a storage system, most zero-data blocks are invalid data filled by an application layer. Therefore, the blocks need to be excluded during evaluation.

In another possible implementation, the first logical unit provides storage space for a virtual machine, and the preset rule may include: determining a service type whose proportion is greater than a third threshold as the first service type of the first data. The third threshold may be configured based on an actual requirement. This is not specifically limited in this application.

Solution 2: The storage device directly queries the first service type of the first data.

In correspondence with the solution 2, when storing data, the storage device further stores a service type of the data. The service type of the data may be a service type that is of the data and that is determined through manual identification, or a service type that is of the data and that is determined in the solution 1 in S301, or a service type that is of the data and that is determined in another manner.

In a possible implementation, the storage device may store the service type of the data in attribute information of each logical unit.

In another possible implementation, the storage device stores the service type of the data and a logical unit to which the data belongs in a record table, and the record table may be stored at a first preset location in the storage device.

The user may configure the first preset location based on an actual requirement. This is not specifically limited in this application.

For example, Table 1 shows a record table. The record table includes a logical unit and a service type corresponding to the logical unit. L001, L002, L024, and the like are used to represent different logical units, and Y01, Y02, Y05, and the like are used to represent different service types.

TABLE 1

| Logical unit | L001 | L002 | . . . | L024 |
| Service type | Y02 | Y01 | . . . | Y05 |

It should be noted that Table 1 merely shows an example of a form of the record table, and should not constitute a specific limitation on the form of the record table.

For example, the solution 1 of S301 may be implemented as follows: The storage device obtains the record table at the first preset location, and searches the record table for the service type of the first data stored in the first logical unit.

Specifically, the first service type may be classified into the following three cases.

Case 1: The first service type may be one or more of the following: a Sqlserver database type, an Oracle database type, a Mongodb database type, a My-innodb database type, a VDI type, and a VSI type.

The VSI type may be a virtual service type based on different databases. For example, the VSI type may be a virtual type based on an Oracle database.

Case 2: The first service type may be any service type included in a virtual application type.

The service type included in the virtual application type may be one or more of the following: a VDI type and a VSI type.

Case 3: The first service type may be any service type included in a database application type.

The service type included in the database application type may be one or more of the following: a Sqlserver database type, an Oracle database type, a Mongodb database type, and a My-innodb database type.

Figure 4:
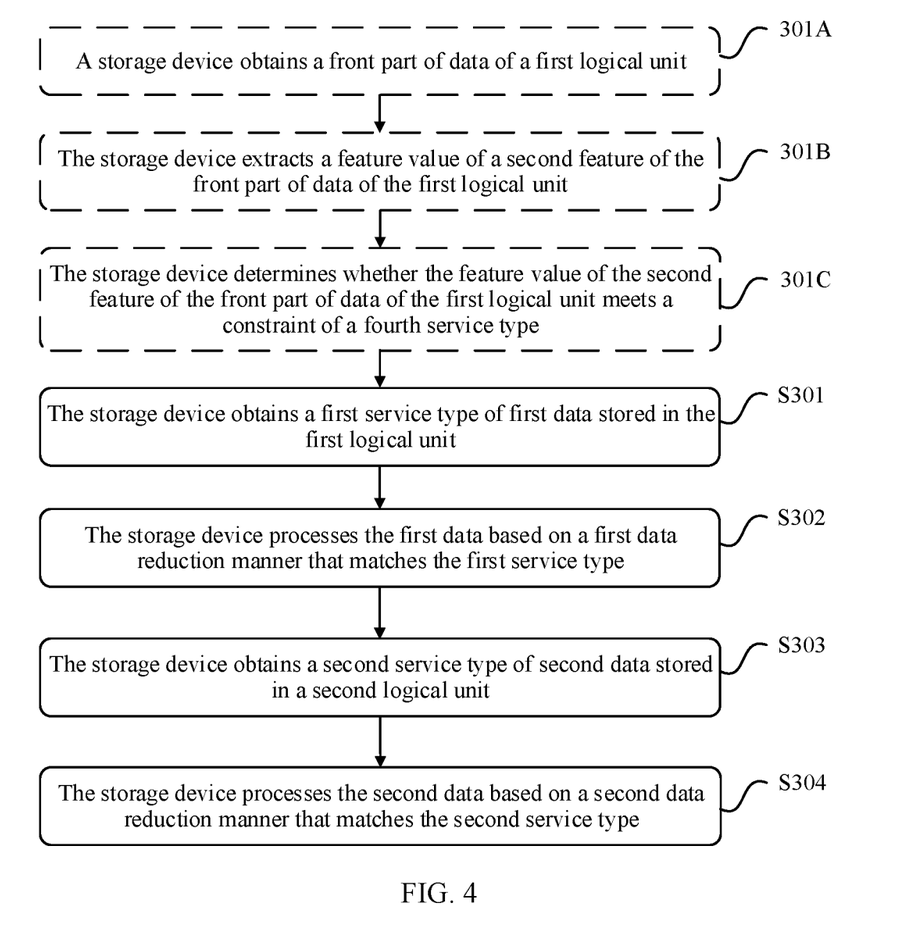
FIG. 4 is a schematic flowchart of another data reduction method according to this application.

When the first service type is the case 2 or case 3, as shown in FIG. 4, before S301 is performed, the data reduction method provided in this application may further include the following S301A to S301C.

301A: The storage device obtains a front part of data of the first logical unit.

The front part of data of the first logical unit may be data of a fixed quantity of bits or a fixed size starting from the first bit in the first logical unit.

Specifically, the fixed quantity of bits or the fixed size may be configured based on an actual requirement. This is not specifically limited in this application.

For example, the front part of data of the first logical unit may be data of a size of 2 gigabytes (GB) starting from the first bit in the first logical unit.

Specifically, 301A may be implemented as follows: The storage device scans the first logical unit, obtains the data of the fixed quantity of bits or the fixed size starting from the first bit in the first logical unit, and uses the data as the front part of data of the first logical unit.

301B: The storage device extracts a feature value of a second feature of the front part of data of the first logical unit.

The second feature is a feature of a fourth service type, and the fourth service type may be a service type included in the virtual application type. For example, the fourth service type may be the VDI type and/or the VSI type.

Example A: The second feature may include: whether "0x656C696678646876" can be found in a data block, and whether "0x64616568" can be found for the first time after 64 kilobytes (Kbyte, KB) after "0x656C696678646876"; and whether "0x64616568" can be found for the second time after 64 KB after "0x64616568" is found, whether "0x69676572" can be found in the following 64 bytes after "0x64616568" is found for the second time, and whether "2DC27766F62342009D64115E9BFD4A08" and "8B7CA20647904B9AB8FE575F050F886E" can be found in the following 64 KB after "0x69676572" is found.

Example B: The second feature may include: whether "conectix" can be found in a data block and content of the $64^{th}$ byte in the data block can be extracted.

For example, 301B may be implemented as follows: The storage device searches for "conectix" in the front part of data of the first logical unit, extracts content of the $64^{th}$ byte in the front part of data of the first logical unit, and uses a search result and the content of the $64^{th}$ byte as the feature value of the second feature.

301C: The storage device determines whether the feature value of the second feature of the front part of data of the first logical unit meets a constraint of the fourth service type.

The constraint of the fourth service type may be configured based on an actual requirement. This is not specifically limited in this application.

The constraint of the fourth service type may include but is not limited to the following constraint 1 to constraint 3.

Constraint 1: "0x656C696678646876" can be found in the data block.

Constraint 2: "0x64616568" can be found for the first time after 64 KB after "0x656C696678646876", and "0x64616568" can be found for the second time after 64 KB after "0x64616568".

Constraint 3: "0x69676572" can be found in the following 64 bytes after "0x64616568" is found for the second time, and "2DC27766F62342009D64115E9BFD4A08" and "8B7CA20647904B9AB8FE575F050F886E" can be found in the following 64 KB after "0x69676572" is found.

For example, the constraint of the fourth service type may include but is not limited to the following constraint 1a to constraint 2a.

Constraint 1a: "conectix" can be found in the data block.

Constraint 2a: The $64^{th}$ byte in the data block stores a checksum calculation result.

For example, the $64^{th}$ byte is a 32-bit cyclic redundancy check (CRC-32) calculation value of 512 bytes starting from the first byte after "conectix" is found.

Specifically, 301C may be implemented as follows: The storage device determines whether the feature value that is of the second feature of the front part of data of the first logical unit and that is obtained in 301B meets the constraint of the fourth service type. If the feature value of the second feature meets the constraint of the fourth service type, the storage device determines that the first service type is any service type included in the virtual application type. Alternatively, if the feature value of the second feature does not meet the constraint of the fourth service type, the storage device determines that the first service type is any service type included in the database application type.

S302: The storage device processes the first data based on a first data reduction manner that matches the first service type.

The first data reduction manner includes data compression and/or data deduplication.

S302 may be implemented as follows: The storage device searches for the first data reduction manner that matches the first service type, and processes the first data in the first data reduction manner.

For example, data reduction manners that match different service types are stored at a second preset location in the storage device. When performing S302, the storage device searches the second preset location for the first data reduction manner that matches the first service type, and then processes the first data in the first data reduction manner.

For example, the data reduction manners that match different service types may be stored, in a form of a table, at the second preset location in the storage device. Table 2 shows data reduction manners that match different service types.

TABLE 2

| Service type | Data reduction manner that matches the service type |
|---|---|
| Oracle type | Prefix compression reduction manner |
| My-innodb type | Prefix compression reduction manner |
| Mongodb type | Hybrid compression document (cimx + word) model reduction manner |
| Sqlserver type | Hybrid compression text (cimx + text) model reduction manner |
| VDI type | Differential compression (delta) reduction manner |
| VSI | ZSTD reduction manner |
| Oracle type + Mongodb type | ZSTD reduction manner |
| ... | ... |

It should be noted that Table 2 merely shows examples of data reduction manners that match different service types, and should not constitute a specific limitation on a storage format of the matching table.

For example, it is assumed that the first service type of the first data obtained in S301 is the Oracle type. S302 may be implemented as follows: The storage device searches Table 2 for a data reduction manner that matches the Oracle type, and obtains the prefix compression reduction manner. Then, the storage device processes the first data in the prefix compression reduction manner.

S303: The storage device obtains a second service type of second data stored in the second logical unit.

The second service type is different from the first service type.

Correspondingly, the second service type may be one or more of the following: the Sqlserver database type, the Oracle database type, the Mongodb database type, the My-innodb database type, the VDI type, and the VSI type.

A method for obtaining, by the storage device, the second service type of the second data stored in the second logical unit in S303 is similar to the method for obtaining, by the storage device, the first service type of the first data stored in the first logical unit. For a specific implementation, refer to S301. Details are not described herein again.

S304: The storage device processes the second data based on a second data reduction manner that matches the second service type.

The second data reduction manner includes data compression and/or data deduplication, and the first data reduction manner is different from the second data reduction manner.

Specifically, a process in which the storage device processes the second data based on the second data reduction manner that matches the second service type in S304 is similar to that in S302. For a specific implementation, refer to S302. Details are not described herein again.

For example, it is assumed that in S303, the second service type that is of the second data stored in the second logical unit and that is obtained by the storage device is the Mongodb type. S304 may be implemented as follows: The storage device searches Table 2 for a data reduction manner that matches the Mongodb type, and obtains the cimx+word reduction manner. Then, the storage device processes the second data in the cimx+word reduction manner.

According to the data reduction method provided in this application, when data stored in different logical units in the storage device is reduced, a service type of the data is first obtained, and for data of a different service type, a reduction manner matching the service type is selected to reduce the data in the logical units, thereby improving data reduction performance.

How the storage device obtains the service type of each sample data block is described in detail by using an example in which the storage device obtains a service type of a first sample data block. The process may specifically include but is not limited to S3011 and S3012.

S3011: The storage device extracts a feature value of a first feature of a first sample data block.

The first feature is a feature of a third service type, and the first sample data block is any sample data block.

In a possible implementation, the third service type may be any one of the following: the Sqlserver database type, the Oracle database type, the Mongodb database type, the My-innodb database type, the VDI type, and the VSI type.

In another possible implementation, service types during feature extraction of the first sample data block are sorted in advance, and the third service type may be the first service type in the sorting.

For example, the service type sorting may be the VDI type, the VSI type, the Oracle database type, the Sqlserver database type, the Mongodb database type, and the My-innodb database type. Correspondingly, the third service type is the VDI type.

Specifically, S3011 may be implemented as follows: The storage device obtains the first sample data block, and then extracts the first feature value of the first sample data block.

S3012: The storage device determines whether the feature value of the first feature meets a constraint of the third service type.

Specifically, if the feature value of the first feature meets the constraint of the third service type, the storage device determines that the service type of the first sample data block is the third service type.

Example A: When the third service type is the Sqlserver database type, the first feature may include a value of the $0^{th}$ byte, a value of the $1^{st}$ byte, a value of the $2^{nd}$ byte, a value of the $3^{rd}$ byte, values of every two bytes starting from the $8060^{th}$ byte, and values of the last two bytes (namely, the $8190^{th}$ byte and the $8191^{st}$ byte) of the data block.

Correspondingly, the constraint of the third service type may include but is not limited to the following A1 to A5.

A1: The $0^{th}$ byte is 0x01.

A2: The value of the $1^{st}$ byte is less than 0x14 and greater than 0x00.

A3: If the value of the $1^{st}$ byte is 0x01 or 0x02, the value of the $2^{nd}$ byte is 0x04. If the value of the $1^{st}$ byte is less than 0x14 and greater than 0x00, and is not 0x01 or 0x02, the value of the $3^{rd}$ byte is 0x00.

A4: Values of any two bytes starting from the $8060^{th}$ byte are less than or equal to 0x1F74.

A5: The last two bytes (namely, the $8190^{th}$ byte and the $8191^{st}$ byte) of the data block are 0x6000 or 0x0060.

Example B1: When the third service type is the Oracle database type, the first feature may include a value of the $0^{th}$ byte, a value of the $1^{st}$ byte, a value of the $2^{nd}$ byte, a value of the $3^{rd}$ byte, and values of the $7^{th}$ to $11^{th}$ bytes.

Correspondingly, the constraint of the third service type may include but is not limited to the following B11 to B15.

B11: The $0^{th}$ byte records a big endian and a little endian. 0x00 indicates the big endian, and 0x01 indicates the little endian. The $0^{th}$ byte is 0x00 or 0x01.

B12: The Pt byte records a size of a metadata block, and the $1^{st}$ byte is 0x82.

B13: The $2^{nd}$ byte records a type of data stored in the block, and a value of the $2^{nd}$ byte ranges from 0x01 to 0x14.

B14: The $3^{rd}$ byte records a format of the block, and a value of the $3^{rd}$ byte ranges from 0x01 to 0x05.

B15: The values of the $7^{th}$ to $11^{th}$ bytes are determined by the $2^{nd}$ byte. If the $2^{nd}$ byte is 0x04 or 0x08, the values of the $7^{th}$ to $11^{th}$ bytes are recorded from 0x0000000000. Otherwise, the values of the $7^{th}$ to $11^{th}$ bytes are recorded from 0x80000000.

Example B2: When the third service type is the Oracle database type, the first feature may include a value of the $1^{st}$ byte, a value of the $2^{nd}$ byte, values of the $3^{rd}$ and $4^{th}$ bytes, a value of the $16^{th}$ byte, values of the last four bytes, and values of the $8^{th}$, $9^{th}$, and $14^{th}$ bytes.

Optionally, the first feature may further include a value of the $20^{th}$ byte and a value of the $17^{th}$ byte.

Correspondingly, the constraint of the third service type may include but is not limited to related parts in the following B21 to B27.

B21: The Pt byte stores a data type, and a value of the $1^{st}$ byte ranges from 0x01 to 0x40.

B22: The $2^{nd}$ byte stores a data block size, and the $2^{nd}$ byte may be 0x62, 0x82, 0xa2, or 0xc2. Alternatively, the $2^{nd}$ byte may be 0x02.

B23: The $3^{rd}$ and $4^{th}$ bytes are 0x00 and 0x00.

B24: The $16^{th}$ byte is 0x01, 0x02, 0x04, 0x08, or a result obtained after an exclusive OR operation is performed on any two of 0x01, 0x02, 0x04, and 0x08.

B25: Values of the last two bytes are the same as those of the $8^{th}$ and $9^{th}$ bytes. A value of the last third byte is the same as that of the $1^{st}$ byte. The value of the last fourth byte is the same as that of the $14^{th}$ byte.

Optionally, the constraint of the third service type may further include:

B26: The value of the $20^{th}$ byte is 0x01 or 0x02.

B27: The values of the $16^{th}$ and $17^{th}$ bytes are obtained by sequentially performing an exclusive OR operation on data of every two bytes in the first 24 bytes of the data block and data of two bytes following the two bytes.

Example B3: When the third service type is the Oracle database type, the first feature may include values of the $0^{th}$ byte and the $1^{st}$ byte, values of the $2^{nd}$ byte and the $3^{rd}$ byte, values of 4 bytes after 512 bits starting from the first bit (the $31^{st}$ byte), values of 4 bytes after the $63^{rd}$ byte, and values of 4 bytes after every 512 bits (32 bytes).

Optionally, the first feature may further include a value of the $20^{th}$ byte and a value of the $17^{th}$ byte.

Correspondingly, the constraint of the third service type may include but is not limited to the following B31 to B33.

B31: The $0^{th}$ and $1^{st}$ bytes are 0x01 and 0x22.

B32: The $2^{nd}$ and $3^{rd}$ bytes are 0x00 and 0x00.

B33: 0x01, 0x22, 0x00, and 0x00 can be found in the data block for 16 times.

Example C: When the third service type is the Mongodb database type, the first feature may include a value of the $24^{th}$ byte, the value of the $25^{th}$ byte, a value of the $28^{th}$ byte, a value of the $29^{th}$ byte, values of the $32^{nd}$ to $35^{th}$ bytes, and a value of the $36^{th}$ byte.

Optionally, the first feature may further include: whether "0x07, 0x5F, 0x69, 0x64, 0x00" can be found in the data block.

Correspondingly, the constraint of the third service type may include but is not limited to related parts in the following C1 to C8.

C1: The $24^{th}$ byte records a type of the data block, and a value of the $24^{th}$ byte ranges from 0x00 to 0x07.

C2: The $25^{th}$ byte records a state of the current block, and a value can be 1, 2, 4, 8, 10, or a result obtained by performing an exclusive OR operation on any quantity of numbers between them. However, 2 and 4 cannot coexist. In other words, 0x06, 0x07, 0x0F, and 0x0E cannot exist. When the $25^{th}$ byte is 0x06, the $25^{th}$ byte is 0x00.

C3: The $28^{th}$ byte records a version number, and the $28^{th}$ byte is 0x00 or 0x01.

C4: The $29^{th}$ byte records a block size, and the $29^{th}$ byte is a multiple of 0x0800 little-endian (0x00 0x08).

C5: The $32^{nd}$ to $35^{th}$ bytes record a checksum value. It is determined based on the value of the $36^{th}$ byte whether data is included. If no data is included, a checksum of the first 32 bytes is calculated, and a checksum algorithm is CRC-32.

C6: The $36^{th}$ byte records whether data is included in the checksum calculation, and the $36^{th}$ byte is 0x01.

C7: An index is not compressed. If there is an index, the $24^{th}$ byte and the $25^{th}$ byte are 0x07 and 0x04 respectively.

Optionally, the constraint of the third service type may further include:

C8: If the $24^{th}$ byte is 0x06, there are keywords 0x07, 0x5F, 0x69, 0x64, and 0x00 in a data area.

Example D: When the third service type is the My-innodb type, the first feature may include values of the $4^{th}$ to $7^{th}$ bytes, the $8^{th}$ to $11^{th}$ bytes, and the $12^{th}$ to $15^{th}$ bytes, values of the $17^{th}$ to $20^{th}$ bytes, and a value of the $25^{th}$ byte.

Correspondingly, the constraint of the third service type may include but is not limited to the following D1 to D3.

D1: Three uint32 numbers starting from the $4^{th}$ byte are ordered, and a relationship is (b1)=(b2+1)=(b3−1).

D2: Values of four bytes starting from the $17^{th}$ byte are equal to values of the last four bytes of the data block.

D3: The $25^{th}$ byte stores a page type, and a value ranges from 0 to 31 or from 17853 to 17855.

Example E1: When the third service type is the VDI type, the first feature may include: whether "0x656C696678646876" can be found in the data block; whether "0x64616568" can be found for the first time after 64 KB after "0x656C696678646876"; whether "0x64616568" can be found for the second time after 64 KB after "0x64616568"; and whether "0x69676572" can be found in the following 64 bytes after "0x64616568" is found for the second time, and whether "2DC27766F62342009D64115E9BFD4A08" and "8B7CA20647904B9AB8FE575F050F886E" can be found in the following 64 KB after "0x69676572" is found.

Correspondingly, the constraint of the third service type may include but is not limited to the following E11 to E13.

E11: "0x656C696678646876" can be found in the data block.

E12: "0x64616568" can be found for the first time after 64 KB after "0x656C696678646876", and "0x64616568" can be found for the second time after 64 KB after "0x64616568".

E13: "0x69676572" can be found in the following 64 bytes after "0x64616568" is found for the second time, and "2DC27766F62342009D64115E9BFD4A08" and "8B7CA20647904B9AB8FE575F050F886E" can be found in the following 64 KB after "0x69676572" is found.

Example E2: When the third service type is the VDI type, the first feature may include: whether "conectix" can be found in the data block and content of the $64^{th}$ byte in the data block can be extracted.

Correspondingly, the constraint of the third service type may include but is not limited to the following E21 and E22.

E21: "conectix" can be found in the data block.

E22: The $64^{th}$ byte in the data block stores a checksum calculation method in which CRC-32 is calculated for 512 bytes starting from the first byte of the keyword found in the first step.

Example F: When the third service type is the VSI type, the first feature may include the feature in Example E1 and the feature in any one of Example A to Example D.

Correspondingly, the constraint of the third service type may include:

the constraint in Example E1 and the constraint in any one of Example A to Example D.

In a possible implementation, the storage device first obtains the first feature value of the first feature of the first sample data block, and determines whether the feature value of the first feature meets the constraint of the third service type. If the feature value of the first feature meets the constraint of the third service type, the storage device determines that the service type of the first sample data block is the third service type. If the feature value of the first feature does not meet the constraint of the third service type, the storage device may further extract a feature value of a third feature of the first sample data block, and determine whether the feature value of the third feature meets a constraint of a fifth service type. The fifth service type is different from the third service type. The storage device may extract feature values of all service types one by one for determining, until a feature of a service type that can meet a constraint is found, and use the service type as the service type of the first sample data block; or the storage device determines that there is no matched service type for the data block.

In another possible implementation, the storage device simultaneously extracts feature values of features of all service types of the first sample data block, then separately compares the feature values with a constraint of each service type, and uses a service type corresponding to a feature value that meets the constraint as the service type of the first sample data block.

Further, the data reduction method provided in this application may further include: The storage device marks the first service type of the first data.

For example, the storage device may mark the first service type of the first data, and store the first service type in the attribute information of the first logical unit.

Optionally, the storage device may further optimize a process such as a read/write process of data storage based on the service type of the data obtained in this application.

Figure 5:
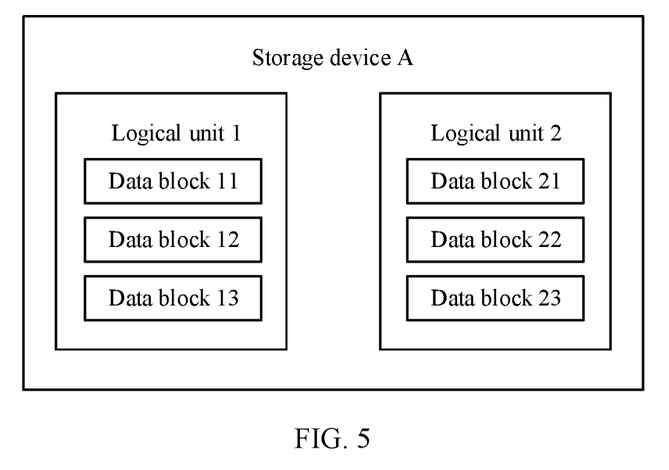
FIG. 5 is a schematic diagram of a structure of still another storage device according to this application.

The following describes in detail the data reduction method provided in this application by using an example in which data in a storage device A is processed.

As shown in FIG. 5, the storage device A includes a logical unit 1 and a logical unit 2. The storage device separately scans the logical unit 1 and the logical unit 2; obtains three sample data blocks of the logical unit 1, which are respectively recorded as a data block 11, a data block 12, and a data block 13; and obtains three sample data blocks of the logical unit 2, which are respectively recorded as a data block 21, a data block 22, and a data block 23.

Then, the storage device A separately extracts a feature value of a Sqlserver database type, a feature value of an Oracle database type, a feature value of a Mongodb database type, a feature value of a My-innodb database type, a feature value of a VDI type, and a feature value of a VSI type of the data block 11, and compares each feature value with a constraint of a service type corresponding to the feature, to obtain that the feature value of the Oracle database type in the data block 11 meets a constraint of the Oracle database type. The storage device A determines that a service type of the data block 11 is the Oracle database type. By using the same method, the storage device A determines that a service type of the data block 12 is the Oracle database type, and the storage device A determines that a service type of the data block 13 is the Oracle database type.

Service types of the data block 11, the data block 12, and the data block 13 included in the logical unit 1 are all the Oracle database type. Therefore, the storage device A determines that a service type of data in the logical unit 1 is the Oracle database type. The storage device A searches the matching table 1 for a data reduction manner that matches the Oracle type, and obtains the prefix compression reduction manner. Then, the storage device A processes the data in the logical unit 1 in the prefix compression reduction manner.

The storage device A obtains, by using a method the same as that of the logical unit 1, that service types of the data block 21, the data block 22, and the data block 23 are all the VDI type. Therefore, the storage device A determines that a service type of data in the logical unit 2 is the VDI type. The storage device A searches the matching table 1 for a data reduction manner that matches the VDI type, and obtains the delta reduction manner. Then, the storage device A processes the data in the logical unit 2 in the delta reduction manner.

The foregoing mainly describes the solutions provided in embodiments of this application from a perspective of a working principle of the data reduction apparatus. It may be understood that, to implement the foregoing functions, the data reduction apparatus includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

In embodiments of this application, a data reduction apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example and is merely logical function division. There may be another division manner in an actual implementation.

Figure 6:
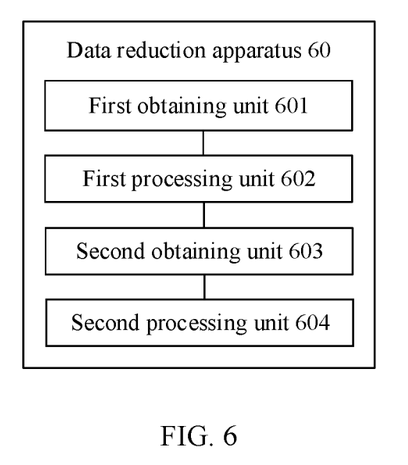
FIG. 6 is a schematic diagram of a structure of a data reduction apparatus according to this application.

When each function module is obtained through division based on each corresponding function, FIG. 6 is a schematic diagram of a possible structure of a data reduction apparatus 60 in the foregoing embodiments. The data reduction apparatus may be a storage device, or a function module or a chip in a storage device, or an apparatus that matches a storage device for use. As shown in FIG. 6, the data reduction apparatus 60 may include a first obtaining unit 601, a first processing unit 602, a second obtaining unit 603, and a second processing unit 604. The first obtaining unit 601 is configured to perform the process S301 in FIG. 3 or FIG. 4. The first processing unit 602 is configured to perform the process S302 in FIG. 3 or FIG. 4. The second obtaining unit 603 is configured to perform the process S303 in FIG. 3 or FIG. 4. The second processing unit 604 is configured to perform the process S304 in FIG. 3 or FIG. 4. All related content of the steps in the foregoing method embodiments may be cited in function descriptions of corresponding function modules. Details are not described herein again.

Figure 7:
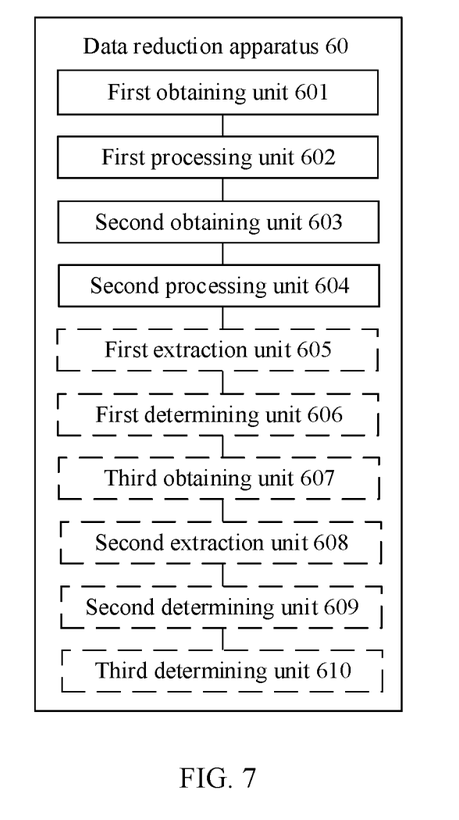
FIG. 7 is a schematic diagram of a structure of another data reduction apparatus according to this application.

Further, as shown in FIG. 7, the data reduction apparatus 60 may further include a first extraction unit 605, a first determining unit 606, a third obtaining unit 607, a second extraction unit 608, a second determining unit 609, and a third determining unit 610. The first extraction unit 605 is configured to perform related steps of the process S301 in FIG. 4. The first determining unit 606 is configured to perform related steps of the process S301 in FIG. 4. The third obtaining unit 607 is configured to perform the process S301A in FIG. 4. The second extraction unit 608 is configured to perform the process S301B in FIG. 4. The second determining unit 609 is configured to perform the process S301C in FIG. 4. The third determining unit 610 is configured to perform the process S301C in FIG. 4.

Figure 8:
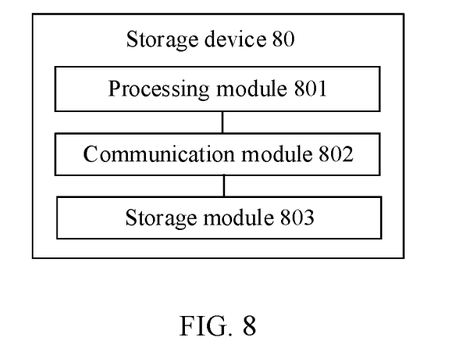
FIG. 8 is a schematic diagram of a structure of yet another storage device according to this application.

When the integrated unit is used, FIG. 8 is a schematic diagram of a possible structure of a storage device 80 in the foregoing embodiments. The storage device 80 is configured to implement the data reduction method provided in this application. As shown in FIG. 8, the storage device 80 may include a processing module 801 and a communication module 802. The processing module 801 is configured to control and manage an action of the storage device 80. For example, the processing module 801 is configured to perform S301 to S304 in FIG. 3 or FIG. 4, or perform processes S301A to S301C in FIG. 4. The communication module 802 is configured to support the storage device 80 in communicating with another unit. The storage device 80 may further include a storage module 803, configured to store program code and data of the storage device 80.

The processing module 801 may be the processor 201 in an entity structure of the storage device 20 shown in FIG. 2, and may be a processor or a controller. For example, the processing module 801 may be a CPU, a general-purpose processor, a DSP, an ASIC, an FPGA or another programmable logic device, a transistor logic device, a hardware component, or any combination thereof. The processing module 801 may implement or execute various example logical blocks, modules, and circuits described with reference to content disclosed in this application. The processing module 801 may alternatively be a combination for implementing computing functions, such as a combination of one or more microprocessors, a combination of a DSP and a microprocessor, or the like. The communication module 802 may be the transceiver 203 in the entity structure of the storage device 20 shown in FIG. 2. The communication module 802 may be a communication port, a transceiver, a transceiver circuit, a communication interface, or the like. Alternatively, the communication interface may communicate with another device by using the foregoing element that has receiving and sending functions. The foregoing element that has receiving and sending functions may be implemented by using an antenna and/or a radio frequency apparatus. The storage module 803 may be the memory 202 in the entity structure of the storage device 20 shown in FIG. 2.

When the processing module 801 is a processor, the communication module 802 is a transceiver, and the storage module 803 is a memory, in embodiments of this application, the storage device 80 in FIG. 8 may be the storage device 20 shown in FIG. 2.

As described above, the data reduction apparatus 60 or the storage device 80 provided in embodiments of this application may be configured to implement functions in the methods implemented in the foregoing embodiments of this application. For ease of description, only a part related to embodiments of this application is shown, and for specific technical details that are not disclosed, refer to embodiments of this application.

In another form of this embodiment, a computer-readable storage medium is provided. The computer-readable storage medium stores instructions. When the instructions are executed, the data reduction method in the foregoing method embodiments is performed.

In another form of this embodiment, a computer program product including instructions is provided. When the computer program product runs on a computer, the computer is enabled to perform the data reduction method in the foregoing method embodiments.

An embodiment of this application further provides a chip system. The chip system includes a processor, configured to implement the technical method according to embodiments of the present invention. In a possible design, the chip system further includes a memory, configured to store program instructions and/or data that are/is necessary for embodiments of the present invention. In a possible design, the chip system further includes a memory, configured to enable the processor to invoke application program code stored in the memory. The chip system may include one or more chips, or may include a chip and another discrete component. This is not specifically limited in this embodiment of this application.

What is claimed is:

1. A data reduction method applied to a storage device comprising at least a first logical unit and a second logical unit, the first logical unit and the second logical unit are configured to provide storage space for an application, the method comprising:
   obtaining a first service type of first data stored in the first logical unit;
   processing the first data based on a first data reduction method for the first service type, wherein the first data reduction method comprises data compression and/or data deduplication;
   obtaining a second service type of second data stored in the second logical unit, wherein the second service type is different from the first service type;
   processing the second data based on a second data reduction method for the second service type, wherein the second data reduction method comprises data compression and/or data deduplication, wherein
   the first data reduction method is different from the second data reduction method;
   obtaining a front part of data of the first logical unit;
   extracting a feature value of a second feature of the front part of the data, wherein the second feature is of a third service type; and
   if the feature value of the second feature meets a constraint of the third service type, determining that the third service type is any service type comprised in a virtual application type.

2. The method according to claim 1, wherein the first data comprises a plurality of first data blocks, and obtaining the first service type of the first data comprises:
   obtaining at least two sample data blocks of the plurality of first data blocks; and
   determining the first service type of the first data based on a service type of the at least two sample data blocks.

3. The method according to claim 2, wherein, when the service type of the at least two sample data blocks is a same service type, determining the first service type of the first data comprises:
   determining that the first service type of the first data is consistent with the service type of the at least two sample data blocks.

4. The method according to claim 2, wherein determining the first service type of the first data comprises:
   if the service type of the at least two sample data blocks comprises a plurality of service types, determining the first service type of the first data based on proportions of the plurality of service types and a preset rule.

5. The method according to claim 4, wherein if the first logical unit provides storage space for a database, the preset rule comprises:
   determining a service type of the plurality of service types with a highest proportion as the first service type of the first data.

6. The method according to claim 4, wherein if the first logical unit provides storage space for a virtual machine, the preset rule comprises:
   determining a service type of the plurality of service types whose proportion is greater than a threshold as the first service type of the first data.

7. The method according to claim 2 further comprising:
   extracting a feature value of a first feature of a first sample data block, wherein the first feature is of the third service type, and the first sample data block is any sample data block in the at least two sample data blocks; and if the feature value of the first feature meets a constraint of the third service type, determining that a service type of the first sample data block is the third service type.

8. The method according to claim 1, wherein the first service type comprises one or more of a Sqlserver database type, an Oracle database type, a Mongodb database type, a My-innodb database type, a VDI type, and a VSI type; and the second service type comprises one or more of the Sqlserver database type, the Oracle database type, the Mongodb database type, the My-innodb database type, the VDI type, and the VSI type.

9. The method according to claim 1, wherein the virtual application type is one or more of a virtual desktop infrastructure VDI type and a virtual server infrastructure VSI type.

10. An apparatus comprising:

a first logical unit and a second logical unit, the first logical unit and the second logical unit being configured to provide storage space for an application; and a processor configured to:

obtain a first service type of first data stored in the first logical unit;

process the first data based on a first data reduction method for the first service type, wherein the first data reduction method comprises data compression and/or data deduplication;

obtain a second service type of second data stored in the second logical unit, wherein the second service type is different from the first service type; and process the second data based on a second data reduction method for the second service type, wherein the second data reduction method comprises data compression and/or data deduplication, wherein the first data reduction method is different from the second data reduction method;

obtaining a front part of data of the first logical unit;

extracting a feature value of a second feature of the front part of the data, wherein the second feature is of a third service type; and if the feature value of the second feature meets a constraint of the third service type, determining that the third service type is any service type comprised in a virtual application type.

11. The apparatus according to claim 10, wherein the first data comprises a plurality of first data blocks, and the processor is configured to:

obtain at least two sample data blocks in the plurality of first data blocks; and determine the first service type of the first data based on a service type of the at least two sample data blocks.

12. The apparatus according to claim 11, wherein the processor is configured to determine that the first service type of the first data is consistent with the service type of the at least two sample data blocks if the service type of the at least two sample data blocks is a same service type.

13. The apparatus according to claim 11, wherein if the service type of the at least two sample data blocks comprises a plurality of service types, the processor is configured to determine the first service type of the first data based on proportions of the plurality of service types and a preset rule.

14. The apparatus according to claim 13, wherein if the first logical unit provides storage space for a database, the preset rule comprises determining a service type with a highest proportion as the first service type of the first data.

15. The apparatus according to claim 13, wherein if the first logical unit provides storage space for a virtual machine, the preset rule comprises determining a service type whose proportion is greater than a threshold as the first service type of the first data.

16. The apparatus according to claim 11, wherein the processor is further configured to:

extract a feature value of a first feature of a first sample data block, wherein the first feature is of the third service type, and the first sample data block is any sample data block in the at least two sample data blocks; and if the feature value of the first feature meets a constraint of the third service type, determine that a service type of the first sample data block is the third service type.

17. The apparatus according to claim 10, wherein the first service type comprises one or more of a Sqlserver database type, an Oracle database type, a Mongodb database type, a My-innodb database type, a VDI type, and a VSI type; and the second service type comprises one or more of the Sqlserver database type, the Oracle database type, the Mongodb database type, the My-innodb database type, the VDI type, and the VSI type.

18. The apparatus according to claim 10, wherein the virtual application type is one or more of a virtual desktop infrastructure VDI type and a virtual server infrastructure VSI type.

* * * * *